US012188420B2

(12) United States Patent
Groth et al.

(10) Patent No.: US 12,188,420 B2
(45) **Date of Patent: *Jan. 7, 2025**

(54) COMBINED ENGINE BRAKING AND POSITIVE POWER ENGINE LOST MOTION VALVE ACTUATION SYSTEM

(71) Applicant: Jacobs Vehicle Systems, Inc., Bloomfield, CT (US)

(72) Inventors: Kevin P. Groth, Southington, CT (US); Brian L. Ruggiero, East Granby, CT (US); Shengqiang Huang, West Simsbury, CT (US); Neil E. Fuchs, New Hartford, CT (US); John J. Lester, West Hartford, CT (US); Steven N. Ernest, Windsor, CT (US); Joseph Paturzo, Avon, CT (US)

(73) Assignee: Jacobs Vehicle Systems, Inc., Bloomfield, CT (US)

(*) Notice: Subject to any disclaimer, the term of this patent is extended or adjusted under 35 U.S.C. 154(b) by 482 days.

This patent is subject to a terminal disclaimer.

(21) Appl. No.: 16/689,937

(22) Filed: Nov. 20, 2019

(65) Prior Publication Data

US 2020/0141335 A1 May 7, 2020

Related U.S. Application Data

(60) Division of application No. 14/274,899, filed on May 12, 2014, which is a continuation of application No.
(Continued)

(51) Int. Cl.
*F01L 1/34* (2006.01)
*F01L 1/18* (2006.01)
(Continued)

(52) U.S. Cl.
CPC ................ *F02D 13/04* (2013.01); *F01L 1/18* (2013.01); *F01L 1/26* (2013.01); *F01L 13/06* (2013.01);
(Continued)

(58) Field of Classification Search
CPC ......... F01L 13/06; F01L 13/065; F01L 13/18; F01L 13/26; F01L 13/0005; F01L 1/08;
(Continued)

(56) References Cited

U.S. PATENT DOCUMENTS 3,220,392 A 11/1965 Cummins
3,809,033 A 5/1974 Cartledge
(Continued)

FOREIGN PATENT DOCUMENTS

CN 101076655 A 11/2007
CN 101142380 A 3/2008
(Continued)

OTHER PUBLICATIONS

Extended European Search issued in EP 11 81 3141 dated May 14, 2014.
(Continued)

*Primary Examiner* — Gonzalo Laguarda
(74) *Attorney, Agent, or Firm* — Jordan IP Law, LLC

(57) ABSTRACT

A system for actuating one or more engine valves for positive power operation and engine braking operation is disclosed. In a preferred embodiment, an exhaust valve bridge and intake valve bridge each receive valve actuations from two sets of rocker arms. Each valve bridge includes a sliding pin for actuating a single engine valve and an outer plunger disposed in the center of the valve bridge to actuate two engine valves through the bridge. The outer plunger of each valve bridge may be selectively locked to its valve bridge to provide positive power valve actuation. During
(Continued)

engine braking, application of hydraulic pressure to the outer plungers may cause the respective valve bridges and outer plungers to unlock so that all engine braking valve actuations are provided from a rocker arm acting on one engine valve through the sliding pin.

10 Claims, 6 Drawing Sheets

Related U.S. Application Data

13/192,330, filed on Jul. 27, 2011, now Pat. No. 8,936,006.

(60) Provisional application No. 61/368,248, filed on Jul. 27, 2010.

(51) Int. Cl.

*F01L 1/26* (2006.01)
*F01L 13/06* (2006.01)
*F02D 13/02* (2006.01)
*F02D 13/04* (2006.01)

(52) U.S. Cl.

CPC ........ *F01L 13/065* (2013.01); *F02D 13/0203* (2013.01); *F02D 13/0273* (2013.01)

(58) Field of Classification Search

CPC ... F01L 1/181; F01L 1/26; F01L 1/267; F01L 1/18; F02D 13/04; F02D 13/0203; F02D 13/0273; F02D 13/0276

USPC ......... 123/90.12, 320, 321, 322, 323, 90.15, 123/90.2, 90.21, 90.22, 90.25, 90.26, 123/90.36, 90.39, 90.4, 90.41, 90.42, 123/90.43, 90.46

See application file for complete search history.

(56) References Cited

U.S. PATENT DOCUMENTS 4,576,128 A 3/1986 Kenichi
4,592,319 A 6/1986 Meistrick
4,612,884 A 9/1986 Ajiki
4,829,948 A 5/1989 Yoshida
5,146,890 A 9/1992 Gobert et al.
5,365,916 A * 11/1994 Freiburg ............... F01L 13/065 123/320
5,388,552 A 2/1995 Sugimoto
5,537,976 A 7/1996 Hu
5,553,584 A 9/1996 Konno
5,619,965 A 4/1997 Cosma et al.
5,787,859 A 8/1998 Meistrick et al.
5,809,964 A 9/1998 Meistrick
5,934,263 A 8/1999 Russ et al.
5,979,379 A 11/1999 Sato
6,085,705 A 7/2000 Vorih
6,189,504 B1 2/2001 Israel et al.
6,293,239 B1 9/2001 Herbst
6,394,067 B1 5/2002 Usko
6,422,186 B1 7/2002 Vanderpoel
6,510,824 B2 1/2003 Vorih et al.
6,594,996 B2 7/2003 Yang
6,694,933 B1 2/2004 Lester
6,827,067 B1 12/2004 Yang et al.
6,883,492 B2 4/2005 Vanderpoel et al.
7,284,533 B1 10/2007 Huang
7,509,933 B2 3/2009 Dingle
7,565,896 B1 7/2009 Yang
7,673,600 B2 * 3/2010 Yang ....................... F01L 1/181 123/90.16
7,712,449 B1 5/2010 Schwoerer
7,905,208 B2 * 3/2011 Ruggiero ................ F02D 13/04 123/90.22
7,909,015 B2 * 3/2011 Yang ....................... F01L 13/06 123/321
8,161,936 B2 4/2012 Kraft et al.
8,225,769 B2 7/2012 Dilly
8,550,047 B2 10/2013 Odell
8,935,076 B2 1/2015 Ide
2003/0221663 A1 12/2003 Vanderpoel et al.
2004/0187842 A1 9/2004 Yang
2004/0231639 A1 11/2004 Israel et al.
2004/0244751 A1 12/2004 Falkowski
2005/0016479 A1 1/2005 Tawa
2005/0211206 A1 * 9/2005 Ruggiero .............. F01L 1/2416 123/90.16
2006/0081213 A1 4/2006 Yang
2007/0144472 A1 * 6/2007 Yang ..................... F01L 13/085 123/90.16
2007/0266973 A1 11/2007 Lancefield
2008/0006231 A1 * 1/2008 Noss ....................... F01L 1/267 123/90.12
2008/0230023 A1 9/2008 Sugiura
2009/0145390 A1 6/2009 Morelli
2010/0006062 A1 1/2010 Yang
2010/0024767 A1 2/2010 Meneely
2010/0065019 A1 * 3/2010 Yang ....................... F02D 13/04 123/321
2010/0170472 A1 * 7/2010 Yang ..................... F01L 13/065 123/321
2010/0307434 A1 12/2010 Odell
2011/0203549 A1 8/2011 Schnell
2012/0024260 A1 2/2012 Groth et al.
2013/0239919 A1 9/2013 Manther
2014/0326212 A1 11/2014 Baltrucki

FOREIGN PATENT DOCUMENTS

CN 101270693 A 9/2008
CN 101490393 A 7/2009
CN 201507333 U 6/2010
DE 19712668 C1 5/1998
EP 1219792 A2 7/2002
EP 1857642 A1 11/2007
EP 2143896 A1 1/2010
EP 2305967 A1 4/2011
JP 861252816 A 11/1986
JP H02223613 A 9/1990
JP H07127410 A 5/1995
JP 2668311 10/1997
JP H10220210 A 8/1998
JP 2000510546 8/2000
JP 3368521 B2 1/2003
JP 2004060498 A 2/2004
JP 2004360485 A 12/2004
JP 2009024660 A 2/2009
JP 2009138742 A 6/2009
JP 2009526160 A 7/2009
JP 2013527380 6/2013
JP 2013536347 9/2013
WO 2004059131 A2 7/2004

OTHER PUBLICATIONS

Extended European Search issued in EP 15 17 5525 on Dec. 14, 2015, 6 pages.
English Translation of Examination Report in Korean Application No. 10-215-0071932 dated May 23, 2016, 3 pages.
N. Fuchs et al., “Development of a High Performance Two-Cycle Engine Brake for Medium and Heavy Duty Diesel Engines,” SAE Int. J. Commer. Veh., vol. 6, Issue 1, May 2013, 13 pages.
Office Action in Chinese Application No. 2017100187736 dated Jun. 11, 2019, 16 pages.

* cited by examiner

COMBINED ENGINE BRAKING AND POSITIVE POWER ENGINE LOST MOTION VALVE ACTUATION SYSTEM

FIELD

The present invention relates generally to systems and methods for actuating one or more engine valves in an internal combustion engine. In particular, the invention relates to systems and methods for valve actuation including a lost motion system. Embodiments of the present invention may be used during positive power and engine braking operation of an internal combustion engine.

The present invention also relates generally to the field of engine brakes for internal combustion engines, both of the compression release type and of the bleeder brake type.

BACKGROUND

Valve actuation in an internal combustion engine is required in order for the engine to produce positive power, and may also be used to produce auxiliary valve events. During positive power, intake valves may be opened to admit fuel and air into a cylinder for combustion. One or more exhaust valves may be opened to allow combustion gas to escape from the cylinder. Intake, exhaust, and/or auxiliary valves may also be opened during positive power at various times for exhaust gas recirculation (EGR) for improved emissions.

Engine valve actuation also may be used to produce engine braking and brake gas recirculation (BGR) when the engine is not being used to produce positive power. During engine braking, one or more exhaust valves may be selectively opened to convert, at least temporarily, the engine into an air compressor. In doing so, the engine develops retarding horsepower to help slow the vehicle down. This can provide the operator with increased control over the vehicle and substantially reduce wear on the service brakes of the vehicle.

Engine valve(s) may be actuated to produce compression-release braking and/or bleeder braking. The operation of a compression-release type engine brake, or retarder, is well known. As a piston travels upward during its compression stroke, the gases that are trapped in the cylinder are compressed. The compressed gases oppose the upward motion of the piston. During engine braking operation, as the piston approaches the top dead center (TDC), at least one exhaust valve is opened to release the compressed gases in the cylinder to the exhaust manifold, preventing the energy stored in the compressed gases from being returned to the engine on the subsequent expansion down-stroke. In doing so, the engine develops retarding power to help slow the vehicle down. An example of a prior art compression release engine brake is provided by the disclosure of Cummins, U.S. Pat. No. 3,220,392, which is incorporated herein by reference.

The operation of a bleeder type engine brake has also long been known. During engine braking, in addition to the normal exhaust valve lift, the exhaust valve(s) may be held slightly open continuously throughout the remaining engine cycle (full-cycle bleeder brake) or during a portion of the cycle (partial-cycle bleeder brake). The primary difference between a partial-cycle bleeder brake and a full-cycle bleeder brake is that the former does not have exhaust valve lift during most of the intake stroke. An example of a system and method utilizing a bleeder type engine brake is provided by the disclosure of U.S. Pat. No. 6,594,996, which is incorporated herein by reference.

The basic principles of brake gas recirculation (BGR) are also well known. During engine braking the engine exhausts gas from the engine cylinder to the exhaust manifold and greater exhaust system. BGR operation allows a portion of these exhaust gases to flow back into the engine cylinder during the intake and/or expansion strokes of the cylinder piston. In particular, BGR may be achieved by opening an exhaust valve when the engine cylinder piston is near bottom dead center position at the end of the intake and/or expansion strokes. This recirculation of gases into the engine cylinder may be used during engine braking cycles to provide significant benefits.

In many internal combustion engines, the engine intake and exhaust valves may be opened and closed by fixed profile cams, and more specifically by one or more fixed lobes or bumps which may be an integral part of each of the cams. Benefits such as increased performance, improved fuel economy, lower emissions, and better vehicle drivability may be obtained if the intake and exhaust valve timing and lift can be varied. The use of fixed profile cams, however, can make it difficult to adjust the timings and/or amounts of engine valve lift to optimize them for various engine operating conditions.

One method of adjusting valve timing and lift, given a fixed cam profile, has been to provide a “lost motion” device in the valve train linkage between the valve and the cam. Lost motion is the term applied to a class of technical solutions for modifying the valve motion proscribed by a cam profile with a variable length mechanical, hydraulic, or other linkage assembly. In a lost motion system, a cam lobe may provide the “maximum” (longest dwell and greatest lift) motion needed over a full range of engine operating conditions. A variable length system may then be included in the valve train linkage, intermediate of the valve to be opened and the cam providing the maximum motion, to subtract or lose part or all of the motion imparted by the cam to the valve.

Some lost motion systems may operate at high speed and be capable of varying the opening and/or closing times of an engine valve from engine cycle to engine cycle. Such systems are referred to herein as variable valve actuation (VVA) systems. VVA systems may be hydraulic lost motion systems or electromagnetic systems. An example of a known VVA system is disclosed in U.S. Pat. No. 6,510,824, which is hereby incorporated by reference.

Engine valve timing may also be varied using cam phase shifting. Cam phase shifters vary the time at which a cam lobe actuates a valve train element, such as a rocker arm, relative to the crank angle of the engine. An example of a known cam phase shifting system is disclosed in U.S. Pat. No. 5,934,263, which is hereby incorporated by reference.

Cost, packaging, and size are factors that may often determine the desirableness of an engine valve actuation system. Additional systems that may be added to existing engines are often cost-prohibitive and may have additional space requirements due to their bulky size. Pre-existing engine brake systems may avoid high cost or additional packaging, but the size of these systems and the number of additional components may often result in lower reliability and difficulties with size. It is thus often desirable to provide an integral engine valve actuation system that may be low cost, provide high performance and reliability, and yet not provide space or packaging challenges.

Embodiments of the systems and methods of the present invention may be particularly useful in engines requiring valve actuation for positive power, engine braking valve events and/or BGR valve events. Some, but not necessarily all, embodiments of the present invention may provide a system and method for selectively actuating engine valves utilizing a lost motion system alone and/or in combination with cam phase shifting systems, secondary lost motion systems, and variable valve actuation systems. Some, but not necessarily all, embodiments of the present invention may provide improved engine performance and efficiency during engine braking operation. Additional advantages of embodiments of the invention are set forth, in part, in the description which follows and, in part, will be apparent to one of ordinary skill in the art from the description and/or from the practice of the invention.

SUMMARY

Responsive to the foregoing challenges, Applicants have developed an innovative system for actuating one or more engine valves for positive power operation and engine braking operation, comprising: two exhaust valves; an exhaust valve bridge extending between the two exhaust valves, said exhaust valve bridge having a central opening extending through the exhaust valve bridge, a recess formed along the central opening, and a side opening extending through a first end of the exhaust valve bridge; an exhaust side sliding pin disposed in the exhaust valve bridge side opening, said exhaust side sliding pin contacting one of said two exhaust valves; an exhaust side outer plunger slidably disposed in the exhaust valve bridge central opening, said exhaust side outer plunger having an interior bore defining an exhaust side outer plunger side wall and bottom wall, and a side opening extending through the exhaust side outer plunger side wall; an exhaust side inner plunger slidably disposed in the exhaust side outer plunger interior bore, said exhaust side inner plunger having a recess formed therein; an exhaust side inner plunger spring disposed between the exhaust side inner plunger and the exhaust side outer plunger bottom wall; an exhaust side outer plunger spring disposed below the exhaust side outer plunger bottom wall; an exhaust side wedge roller or ball disposed in the outer plunger side opening; a main exhaust rocker arm disposed above the exhaust side outer plunger and including means for supplying hydraulic fluid to the exhaust side outer plunger interior bore; and a means for actuating one of said two exhaust valves, said means for actuating contacting the exhaust side sliding pin.

Applicants have further developed an innovative system comprising: two intake valves; an intake valve bridge extending between the two intake valves, said intake valve bridge having a central opening extending through the intake valve bridge, a recess formed along the central opening, and a side opening extending through a first end of the intake valve bridge; an intake side sliding pin disposed in the intake valve bridge side opening, said intake side sliding pin contacting one of said two intake valves; an intake side outer plunger slidably disposed in the intake valve bridge central opening, said intake side outer plunger having an interior bore defining an intake side outer plunger side wall and bottom wall, and a side opening extending through the intake side outer plunger side wall; an intake side inner plunger slidably disposed in the intake side outer plunger interior bore, said intake side inner plunger having a recess formed therein; an intake side inner plunger spring disposed between the intake side inner plunger and the intake side outer plunger bottom wall; an intake side outer plunger spring disposed below the intake side outer plunger bottom wall; an intake side wedge roller or ball disposed in the intake side outer plunger side opening; a main intake rocker arm disposed above the intake side outer plunger and including means for supplying hydraulic fluid to the intake side outer plunger interior bore; and a means for actuating one of said two intake valves, said means for actuating contacting the intake side sliding pin.

It is to be understood that both the foregoing general description and the following detailed description are exemplary and explanatory only, and are not restrictive of the invention as claimed.

BRIEF DESCRIPTION OF THE DRAWINGS

In order to assist the understanding of this invention, reference will now be made to the appended drawings, in which like reference characters refer to like elements.

DETAILED DESCRIPTION OF THE PRESENT EMBODIMENTS

Reference will now be made in detail to embodiments of the systems and methods of the present invention, examples of which are illustrated in the accompanying drawings. Embodiments of the present invention include systems and methods of actuating one or more engine valves.

Figure 1:
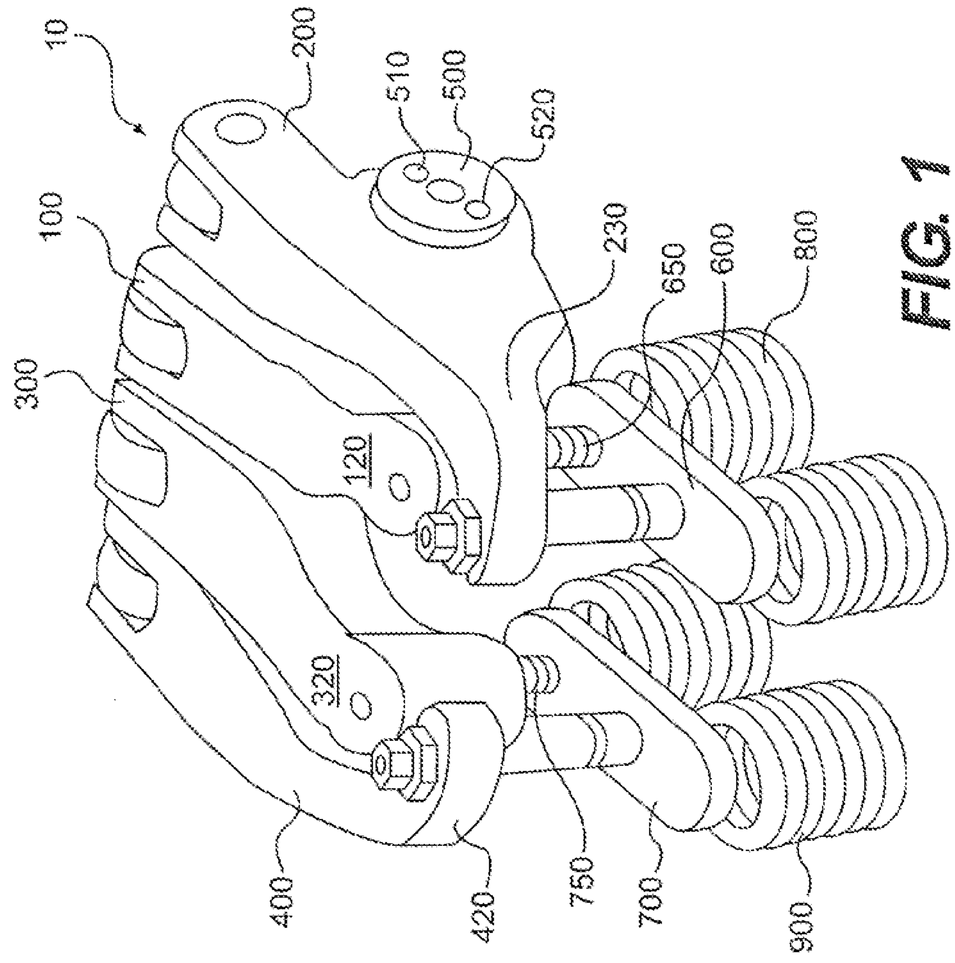
FIG. 1 is a pictorial view of a valve actuation system configured in accordance with a first embodiment of the present invention.

A first embodiment of the present invention is shown in FIG. 1 as valve actuation system 10. The valve actuation system 10 may include a main exhaust rocker arm 200, means for actuating an exhaust valve to provide engine braking 100, a main intake rocker arm 400, and a means for actuating an intake valve to provide engine braking 300. In a preferred embodiment, shown in FIG. 1, the means for actuating an exhaust valve to provide engine braking 100 is an engine braking exhaust rocker arm, referred to by the same reference numeral, and the means for actuating an intake valve to provide engine braking 300 is an engine braking intake rocker arm, referred to by the same reference numeral. The rocker arms 100, 200, 300 and 400 may pivot on one or more rocker shafts 500 which include one or more passages 510 and 520 for providing hydraulic fluid to one or more of the rocker arms.

The main exhaust rocker arm 200 may include a distal end 230 that contacts a center portion of an exhaust valve bridge 600 and the main intake rocker arm 400 may include a distal end 420 that contacts a center portion of an intake valve bridge 700. The engine braking exhaust rocker arm 100 may include a distal end 120 that contacts a sliding pin 650 provided in the exhaust valve bridge 600 and the engine braking intake rocker arm 300 may include a distal end 320 that contacts a sliding pin 750 provided in the intake valve bridge 700. The exhaust valve bridge 600 may be used to actuate two exhaust valve assemblies 800 and the intake valve bridge 700 may be used to actuate two intake valve assemblies 900. Each of the rocker arms 100, 200, 300 and 400 may include ends opposite their respective distal ends which include means for contacting a cam or push tube. Such means may comprise a cam roller, for example.

The cams (described below) that actuate the rocker arms 100, 200, 300 and 400 may each include a base circle portion and one or more bumps or lobes for providing a pivoting motion to the rocker arms. Preferably, the main exhaust rocker arm 200 is driven by a cam which includes a main exhaust bump which may selectively open the exhaust valves during an exhaust stroke for an engine cylinder, and the main intake rocker arm 400 is driven by a cam which includes a main intake bump which may selectively open the intake valves during an intake stroke for the engine cylinder.

Figure 2:
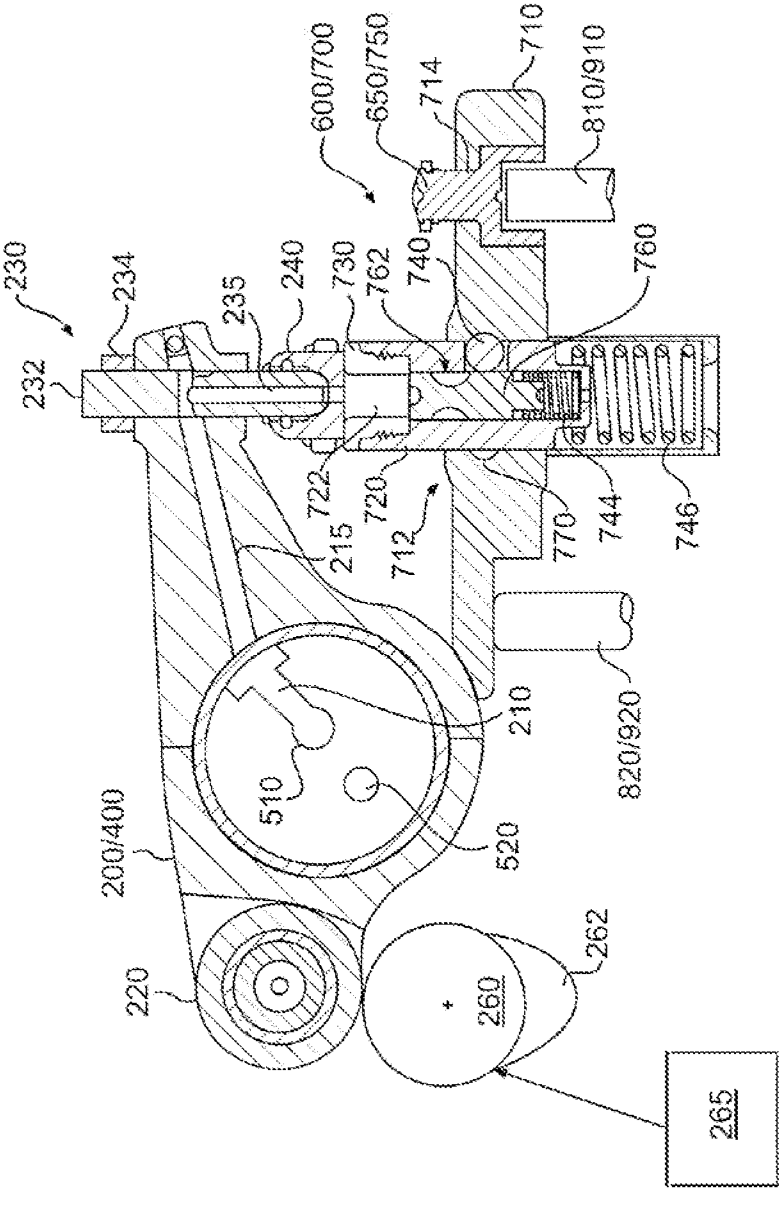
FIG. 2 is a schematic diagram in cross section of a main rocker arm and locking valve bridge configured in accordance with the first embodiment of the present invention.

FIG. 2 illustrates the components of the main exhaust rocker arm 200 and main intake rocker arm 400, as well as the exhaust valve bridge 600 and intake valve bridge 700 in cross section. Reference will be made to the main exhaust rocker arm 200 and exhaust valve bridge 600 because it is appreciated the main intake rocker arm 400 and the intake valve bridge 700 may have the same design and therefore need not be described separately.

With reference to FIG. 2, the main exhaust rocker arm 200 may be pivotally mounted on a rocker shaft 210 such that the rocker arm is adapted to rotate about the rocker shaft 210. A motion follower 220 may be disposed at one end of the main exhaust rocker arm 200 and may act as the contact point between the rocker arm and the cam 260 to facilitate low friction interaction between the elements. The cam 260 may include a single main exhaust bump 262, or for the intake side, a main intake bump. In one embodiment of the present invention, the motion follower 220 may comprise a roller follower 220, as shown in FIG. 2. Other embodiments of a motion follower adapted to contact the cam 260 are considered well within the scope and spirit of the present invention. An optional cam phase shifting system 265 may be operably connected to the cam 260.

Hydraulic fluid may be supplied to the rocker arm 200 from a hydraulic fluid supply (not shown) under the control of a solenoid hydraulic control valve (not shown). The hydraulic fluid may flow through a passage 510 formed in the rocker shaft 210 to a hydraulic passage 215 formed within the rocker arm 200. The arrangement of hydraulic passages in the rocker shaft 210 and the rocker arm 200 shown in FIG. 2 are for illustrative purposes only. Other hydraulic arrangements for supplying hydraulic fluid through the rocker arm 200 to the exhaust valve bridge 600 are considered well within the scope and spirit of the present invention.

An adjusting screw assembly may be disposed at a second end 230 of the rocker arm 200. The adjusting screw assembly may comprise a screw 232 extending through the rocker arm 200 which may provide for lash adjustment, and a threaded nut 234 which may lock the screw 232 in place. A hydraulic passage 235 in communication with the rocker passage 215 may be formed in the screw 232. A swivel foot 240 may be disposed at one end of the screw 232. In one embodiment of the present invention, low pressure oil may be supplied to the rocker arm 200 to lubricate the swivel foot 240.

The swivel foot 240 may contact the exhaust valve bridge 600. The exhaust valve bridge 600 may include a valve bridge body 710 having a central opening 712 extending through the valve bridge and a side opening 714 extending through a first end of the valve bridge. The side opening 714 may receive a sliding pin 650 which contacts the valve stem of a first exhaust valve 810. The valve stem of a second exhaust valve 820 may contact the other end of the exhaust valve bridge.

The central opening 712 of the exhaust valve bridge 600 may receive a lost motion assembly including an outer plunger 720, a cap 730, an inner plunger 760, an inner plunger spring 744, an outer plunger spring 746, and one or more wedge rollers or balls 740. The outer plunger 720 may include an interior bore 22 and a side opening extending through the outer plunger wall for receiving the wedge roller or ball 740. The inner plunger 760 may include one or more recesses 762 shaped to securely receive the one or more wedge rollers or balls 740 when the inner plunger is pushed downward. The central opening 712 of the valve bridge 700 may also include one or more recesses 770 for receiving the one or more wedge rollers or balls 740 in a manner that permits the rollers or balls to lock the outer plunger 720 and the exhaust valve bridge together, as shown. The outer plunger spring 746 may bias the outer plunger 740 upward in the central opening 712. The inner plunger spring 744 may bias the inner plunger 760 upward in outer plunger bore 722.

Hydraulic fluid may be selectively supplied from a solenoid control valve, through passages 510, 215 and 235 to the outer plunger 720. The supply of such hydraulic fluid may displace the inner plunger 760 downward against the bias of the inner plunger spring 744. When the inner plunger 760 is displaced sufficiently downward, the one or more recesses 762 in the inner plunger may register with and receive the one or more wedge rollers or balls 740, which in turn may decouple or unlock the outer plunger 720 from the exhaust valve bridge body 710. As a result, during this "unlocked" state, valve actuation motion applied by the main exhaust rocker arm 200 to the cap 730 does not move the exhaust valve bridge body 710 downward to actuate the exhaust valves 810 and 820. Instead, this downward motion causes the outer plunger 720 to slide downward within the central opening 712 of the exhaust valve bridge body 710 against the bias of the outer plunger spring 746.

Figure 3:
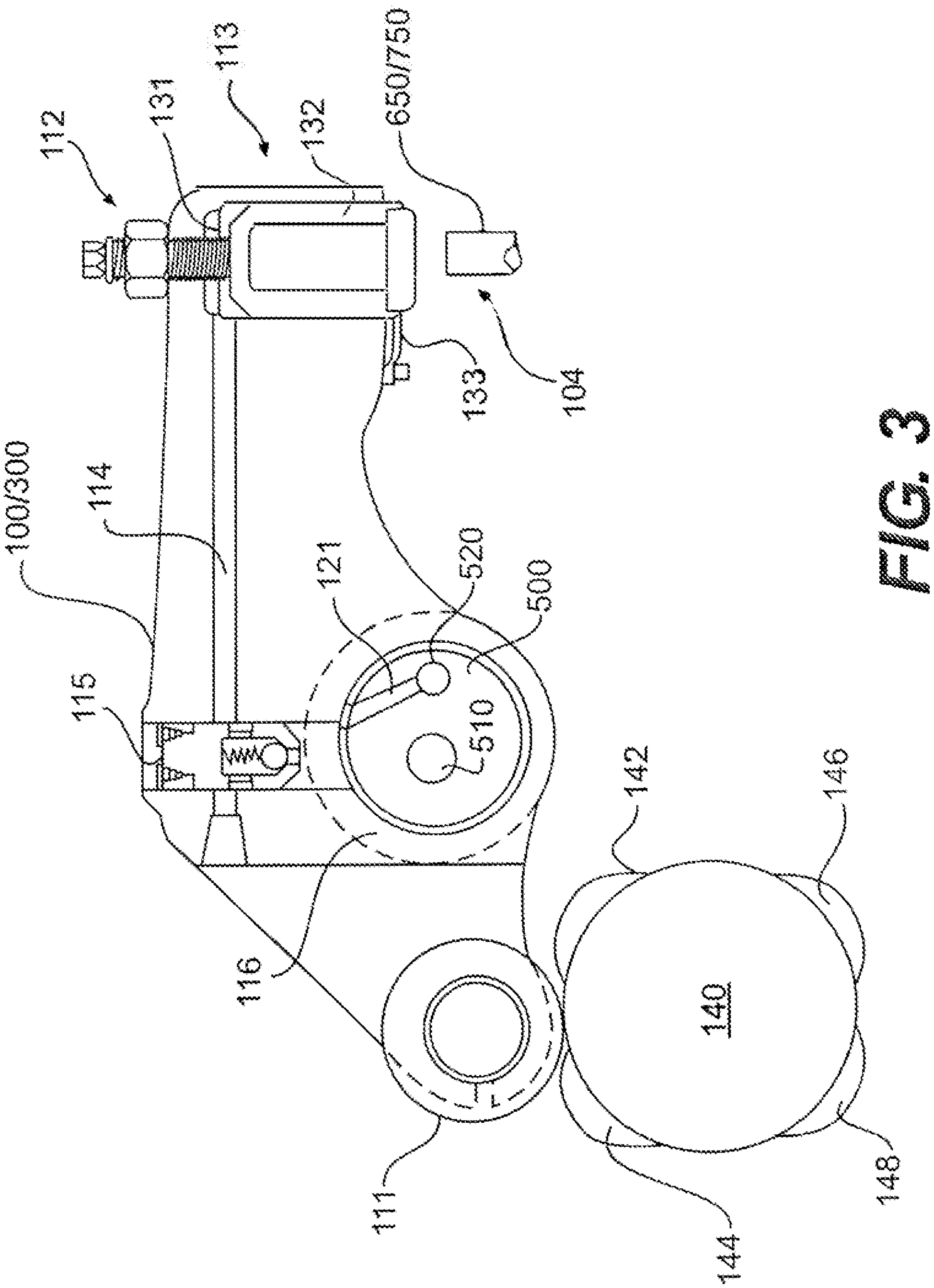
FIG. 3 is a schematic diagram in cross section of an engine braking rocker arm configured in accordance with the first embodiment of the present invention.

With reference to FIGS. 1 and 3, the engine braking exhaust rocker arm 100 and engine braking intake rocker arm 300 may include lost motion elements such as those provided in the rocker arms illustrated in U.S. Pat. Nos. 3,809,033 and 6,422,186, which are hereby incorporated by reference. The engine braking exhaust rocker arm 100 and engine braking intake rocker arm 300 may each have a selectively extendable actuator piston 132 which may take up a lash space 104 between the extendable actuator pistons and the sliding pins 650 and 750 provided in the valve bridges 600 and 700 underlying the engine braking exhaust rocker arm and engine braking intake rocker arm, respectively.

With reference to FIG. 3, the rocker arms 100 and 300 may have the same constituent parts and thus reference will be made to the elements of the exhaust side engine braking rocker arm 100 for ease of description.

A first end of the rocker arm 100 may include a cam lobe follower 111 which contacts a cam 140. The cam 140 may have one or more bumps 142, 144, 146 and 148 to provide compression release, brake gas recirculation, exhaust gas recirculation, and/or partial bleeder valve actuation to the exhaust side engine braking rocker arm 100. When contacting an intake side engine braking rocker arm 300, the cam 140 may have one, two, or more bumps to provide one, two or more intake events to an intake valve. The engine braking rocker arms 100 and 300 may transfer motion derived from cams 140 to operate at least one engine valve each through respective sliding pins 650 and 750.

The exhaust side engine braking rocker arm 100 may be pivotally disposed on the rocker shaft 500 which includes hydraulic fluid passages 510, 520 and 121. The hydraulic passage 121 may connect the hydraulic fluid passage 520 with a port provided within the rocker arm 100. The exhaust side engine braking rocker arm 100 (and intake side engine braking rocker arm 300) may receive hydraulic fluid through the rocker shaft passages 520 and 121 under the control of a solenoid hydraulic control valve (not shown). It is contemplated that the solenoid control valve may be located on the rocker shaft 500 or elsewhere.

The engine braking rocker arm 100 may also include a control valve 115. The control valve 115 may receive hydraulic fluid from the rocker shaft passage 121 and is in communication with the fluid passageway 114 that extends through the rocker arm 100 to the lost motion piston assembly 113. The control valve 115 may be slidably disposed in a control valve bore and include an internal check valve which only permits hydraulic fluid flow from passage 121 to passage 114. The design and location of the control valve 115 may be varied without departing from the intended scope of the present invention. For example, it is contemplated that in an alternative embodiment, the control valve 115 may be rotated approximately 90° such that its longitudinal axis is substantially aligned with the longitudinal axis of the rocker shaft 500.

A second end of the engine braking rocker arm 100 may include a lash adjustment assembly 112, which includes a lash screw and a locking nut. The second end of the rocker arm 100 may also include a lost motion piston assembly 113 below the lash adjuster assembly 112. The lost motion piston assembly 113 may include an actuator piston 132 slidably disposed in a bore 131 provided in the head of the rocker arm 100. The bore 131 communicates with fluid passage 114. The actuator piston 132 may be biased upward by a spring 133 to create a lash space between the actuator piston and the sliding pin 650. The design of the lost motion piston assembly 113 may be varied without departing from the intended scope of the present invention.

Application of hydraulic fluid to the control valve 115 from the passage 121 may cause the control valve to index upward against the bias of the spring above it, as shown in FIG. 3, permitting hydraulic fluid to flow to the lost motion piston assembly 113 through passage 114. The check valve incorporated into the control valve 115 prevents the backward flow of hydraulic fluid from passage 114 to passage 121. When hydraulic fluid pressure is applied to the actuator piston 131, it may move downward against the bias of the spring 133 and take up any lash space between the actuator piston and the sliding pin 650. In turn, valve actuation motion imparted to the engine braking rocker arm 100 from the cam bumps 142, 144, 146 and/or 148 may be transferred to the sliding pin 650 and the exhaust valve 810 below it. When hydraulic pressure is reduced in the passage 121 under the control of the solenoid control valve (not shown), the control valve 115 may collapse into its bore under the influence of the spring above it. Consequently, hydraulic pressure in the passage 114 and the bore 131 may be vented past the top of the control valve 115 to the outside of the rocker arm 100. In turn, the spring 133 may force the actuator piston 132 upward so that the lash space 104 is again created between the actuator piston and the sliding pin 650. In this manner, the exhaust and intake engine braking rocker arms 100 and 300 may selectively provide valve actuation motions to the sliding pins 650 and 750, and thus, to the engine valves disposed below these sliding pins.

Figure 4:
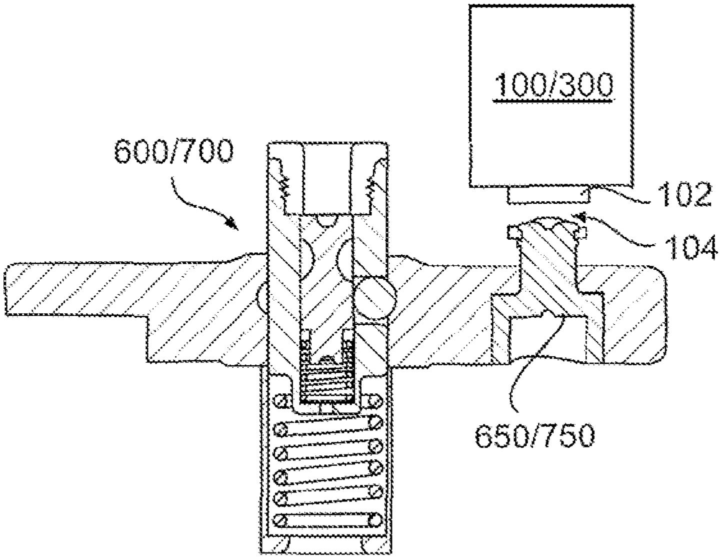
FIG. 4 is a schematic diagram of an alternative engine braking valve actuation means in accordance with an alternative embodiment of the present invention.

With reference to FIG. 4, in another alternative embodiment of the present invention, it is contemplated that the means for actuating an exhaust valve to provide engine braking 100, and/or the means for actuating an intake valve to provide engine braking 300 may be provided by any lost motion system, or any variable valve actuation system, including without limitation, a non-hydraulic system which includes an actuator piston 102. A lash space 104 may be provided between the actuator piston 102 and the underlying sliding pin 650/750, as described above. The lost motion or variable valve actuation system 100/300 may be of any type known to be capable of selectively actuating an engine valve.

The operation of the engine braking rocker arm 100 will now be described. During positive power, the solenoid hydraulic control valve which selectively supplies hydraulic fluid to the passage 121 is closed. As such, hydraulic fluid does not flow from the passage 121 to the rocker arm 100 and hydraulic fluid is not provided to the lost motion piston assembly 113. The lost motion piston assembly 113 remains in the collapsed position illustrated in FIG. 3. In this position, the lash space 104 may be maintained between the lost motion piston assembly 113 and the sliding pin 650/750.

During engine braking, the solenoid hydraulic control valve may be activated to supply hydraulic fluid to the passage 121 in the rocker shaft. The presence of hydraulic fluid within fluid passage 121 causes the control valve 115 to move upward, as shown, such that hydraulic fluid flows through the passage 114 to the lost motion piston assembly 113. This causes the lost motion piston 132 to extend downward and lock into position taking up the lash space 104 such that all movement that the rocker arm 100 derives from the one or more cam bumps 142, 144, 146 and 148 is transferred to the sliding pin 650/750 and to the underlying engine valve.

Figure 5:
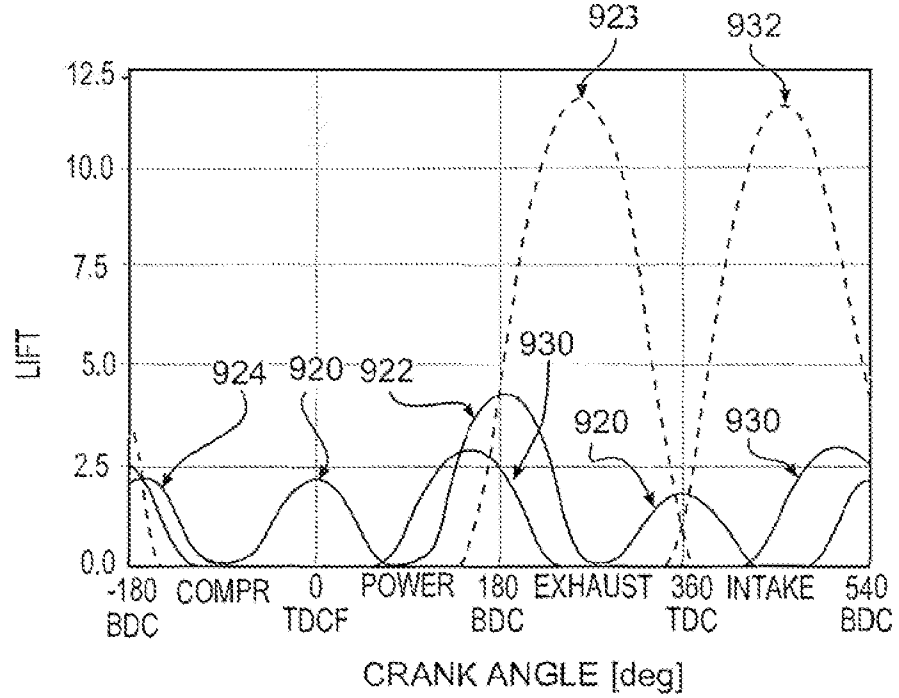
FIG. 5 is a graph illustrating exhaust and intake valve actuations during a two-cycle engine braking mode of operation provided by embodiments of the present invention.

With reference to FIGS. 2, 3 and 5, in a first method embodiment, the system 10 may be operated as follows to provide positive power and engine braking operation. During positive power operation (brake off), hydraulic fluid pressure is first decreased or eliminated in the main exhaust rocker arm 200 and next decreased or eliminated in the main intake rocker arm 400 before fuel is supplied to the cylinder. As a result, the inner plungers 760 are urged into their upper most positions by the inner plunger springs 744, causing the lower portions of the inner plungers to force the one or more wedge rollers or balls 740 into the recesses 770 provided in the walls of the valve bridge bodies 710. This causes the outer plungers 720 and the valve bridge bodies 710 to be "locked" together, as shown in FIG. 2. In turn, the main exhaust and main intake valve actuations that are applied through the main exhaust and main intake rocker arms 200 and 400 to the outer plungers 720 are transferred to the valve bridge bodies 710 and, in turn the intake and exhaust engine valves are actuated for main exhaust and main intake valve events.

During this time, decreased or no hydraulic fluid pressure is provided to the engine braking exhaust rocker arm 100 and the engine braking intake rocker arm 300 (or the means for actuating an exhaust valve to provide engine braking 100 and means for actuating an intake valve to provide engine braking 300) so that the lash space 104 is maintained between each said rocker arm or means and the sliding pins 650 and 750 disposed below them. As a result, neither the engine braking exhaust rocker arm or means 100 nor the engine braking intake rocker arm or means 300 imparts any valve actuation motion to the sliding pins 650 and 750 or the engine valves 810 and 910 disposed below these sliding pins.

During engine braking operation, after ceasing to supply fuel to the engine cylinder and waiting a predetermined time for the fuel to be cleared from the cylinder, increased hydraulic fluid pressure is provided to each of the rocker arms or means 100, 200, 300 and 400. Hydraulic fluid pressure is first applied to the main intake rocker arm 400 and engine braking intake rocker arm or means 300, and then applied to the main exhaust rocker arm 200 and engine braking exhaust rocker arm or means 100.

Application of hydraulic fluid to the main intake rocker arm 400 and main exhaust rocker arm 200 causes the inner plungers 760 to translate downward so that the one or more wedge rollers or balls 740 may shift into the recesses 762. This permits the inner plungers 760 to "unlock" from the valve bridge bodies 710. As a result, main exhaust and intake valve actuation that is applied to the outer plungers 720 is lost because the outer plungers slide into the central openings 712 against the bias of the springs 746. This causes the main exhaust and intake valve events to be "lost."

The application of hydraulic fluid to the engine braking exhaust rocker arm 100 (or means for actuating an exhaust valve to provide engine braking 100) and the engine braking intake rocker arm 300 (or means for actuating an intake valve to provide engine braking 300) causes the actuator piston 132 in each to extend downward and take up any lash space 104 between those rocker arms or means and the sliding pins 650 and 750 disposed below them. As a result, the engine braking valve actuations applied to the engine braking exhaust rocker arm or means 100 and the engine braking intake rocker arm or means 300 are transmitted to the sliding pins 650 and 750, and the engine valves below them.

FIG. 5 illustrates the intake and exhaust valve actuations that may be provided using a valve actuation system 10 that includes a main exhaust rocker arm 200, means for actuating an exhaust valve to provide engine braking 100, a main intake rocker arm 400, and a means for actuating an intake valve to provide engine braking 300, operated as described directly above. The main exhaust rocker arm 200 may be used to provide a main exhaust event 923, and the main intake rocker arm 400 may be used to provide a main intake event 932 during positive power operation.

During engine braking operation, the means for actuating an exhaust valve to provide engine braking 100 may provide a standard BGR valve event 924, an increased lift BGR valve event 922, and two compression release valve events 920. The means for actuating an intake valve to provide engine braking 300 may provide two intake valve events 930 which provide additional air to the cylinder for engine braking. As a result, the system 10 may provide full two-cycle compression release engine braking.

With continued reference to FIG. 5, in a first alternative, the system 10 may provide only one or the other of the two intake valve events 930 as a result of employing a variable valve actuation system to serve as the means for actuating an intake valve to provide engine braking 300. The variable valve actuation system 300 may be used to selectively provide only one or the other, or both intake valve events 930. If only one of such intake valve events is provided, 1.5-cycle compression release engine braking results.

In another alternative, the system 10 may provide only one or the other of the two compression release valve events 920 and/or one, two or none of the BGR valve events 922 and 924 as a result of employing a variable valve actuation system to serve as the means for actuating an exhaust valve to provide engine braking 100. The variable valve actuation system 100 may be used to selectively provide only one or the other, or both compression release valve events 920 and/or none, one or two of the BGR valve events 922 and 924. When the system 10 is configured in this way, it may selectively provide 4-cycle or 2-cycle compression release engine braking with or without BGR.

Figure 6:
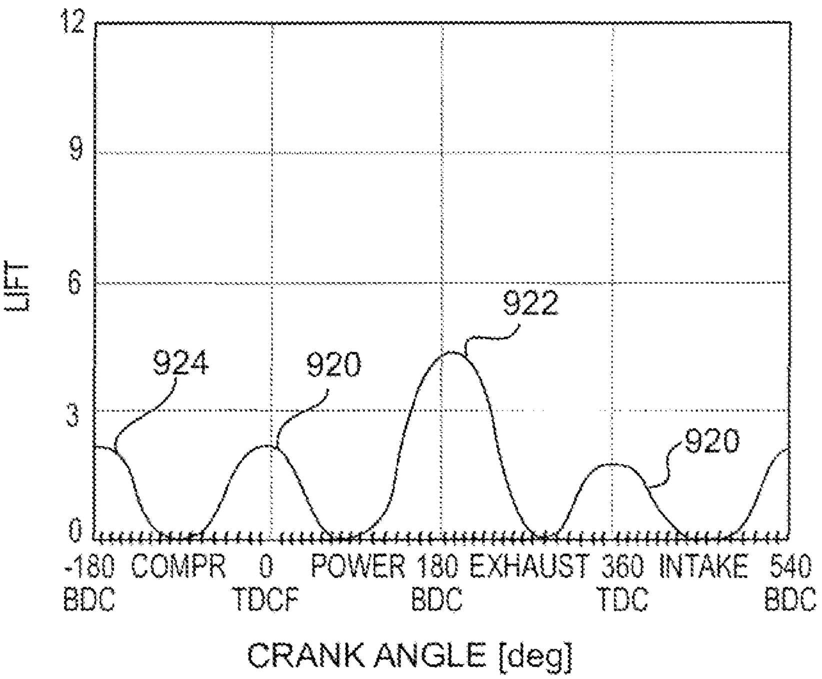
FIG. 6 is a graph illustrating the exhaust valve actuations during a two-cycle engine braking mode of operation provided by embodiments of the present invention.
Figure 7:
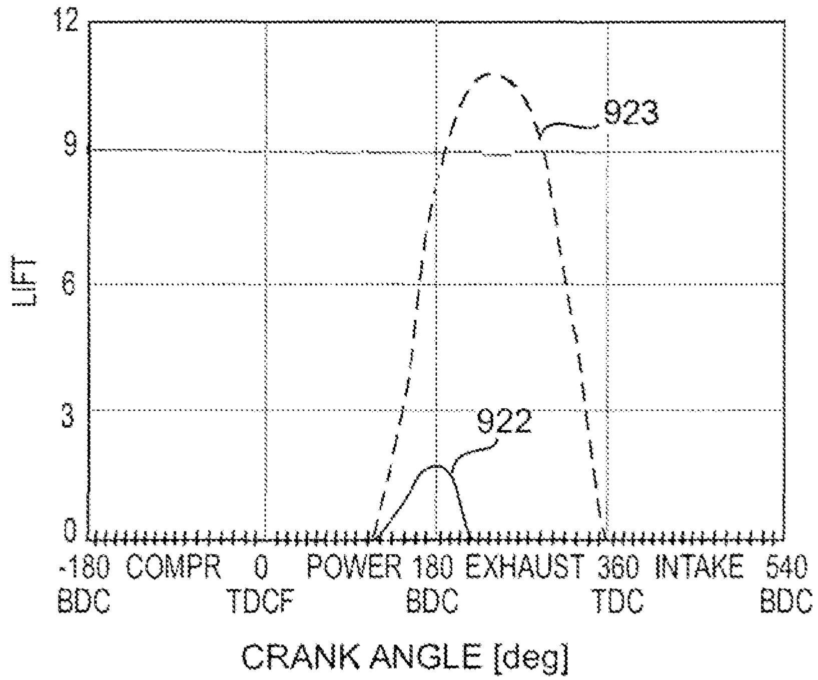
FIG. 7 is a graph illustrating the exhaust valve actuation during a failure mode of operation provided by embodiments of the present invention.

The significance of the inclusion of the increased lift BGR valve event 922, which is provided by having a corresponding increased height cam lobe bump on the cam driving the means for actuating an exhaust valve to provide engine braking 100, is illustrated by FIGS. 6 and 7. With reference to FIGS. 3, 4 and 6, the height of the cam bump that produces the increased lift BGR valve event 922 exceeds the magnitude of the lash space provided between the means for actuating an exhaust valve to provide engine braking 100 and the sliding pin 650. This increased height or lift is evident from event 922 in FIG. 6 as compared with events 920 and 924. During reinstitution of positive power operation using the system 10, it is possible that the exhaust valve bridge 600 will fail to lock to the outer plunger 720, which would ordinarily result in the loss of a main exhaust event 923, which in turn could cause severe engine damage. With reference to FIG. 7, by including the increased lift BGR valve event 922, if the main exhaust event 923 is lost due to a failure, the increased lift BGR valve event 922 will permit exhaust gas to escape from the cylinder near in time to the time that the normally expected main exhaust valve event 923 was supposed to occur, and prevent engine damage that might otherwise result.

Figure 8:
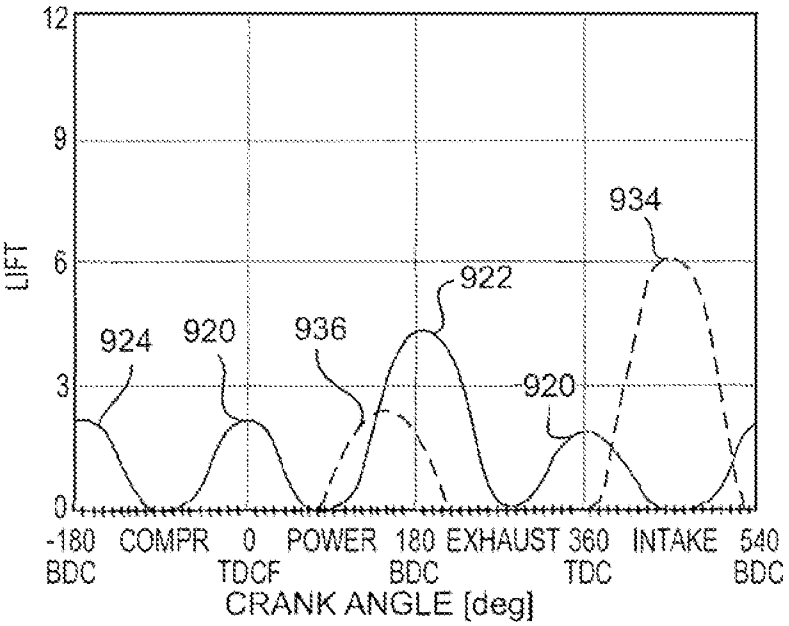
FIG. 8 is a graph illustrating exhaust and intake valve actuations during a two-cycle engine braking mode of operation provided by embodiments of the present invention.

An alternative set of valve actuations, which may be achieved using one or more of the systems 10 describe above, are illustrated by FIG. 8. With reference to FIG. 8, the system used to provide the exhaust valve actuations 920, 922 and 924 are the same as those described above, and the manner of actuating the main exhaust rocker arm 200 and the engine braking exhaust rocker arm 100 (FIG. 3) or means for actuating an exhaust valve to provide engine braking 100 (FIG. 4) are also the same. The main intake rocker arm 400 and manner of operating it are similarly the same as in the previous embodiments.

With continued reference to FIG. 8, one, or the other, or both of the intake valve events 934 and/or 936 may be provided using one of three alternative arrangements. In a first alternative, the means for actuating an intake valve to provide engine braking 300, whether provided as rocker arm or otherwise, may be eliminated from the system 10. With additional reference to FIG. 2, in place of means 300, an optional cam phase shifting system 265 may be provided to operate on the cam 260 driving the main intake rocker arm

400. The cam phase shifting system 265 may selectively modify the phase of the cam 260 with respect to the crank angle of the engine. As a result, with reference to FIGS. 2 and 8, the intake valve event 934 may be produced from the main intake cam bump 262. The intake valve event 934 may be “shifted” to occur later than it ordinarily would occur. Specifically, the intake valve event 934 may be retarded so as not to interfere with the second compression release valve event 920. Intake valve event 936 may not be provided when the cam phase shifting system 265 is utilized, which results in 1.5-cycle compression release engine braking.

Instituting compression release engine braking using a system 10 that includes a cam phase shifting system 265 may occur as follows. First, fuel is shut off to the engine cylinder in question and a predetermined delay is provided to permit fuel to clear from the cylinder. Next, the cam phase shifting system 265 is activated to retard the timing of the main intake valve event. Finally, the exhaust side solenoid hydraulic control valve (not shown) may be activated to supply hydraulic fluid to the main exhaust rocker arm 200 and the means for actuating an exhaust valve to provide engine braking 100. This may cause the exhaust valve bridge body 710 to unlock from the outer plunger 720 and disable main exhaust valve events. Supply of hydraulic fluid to the means for actuating an exhaust valve to provide engine braking 100 may produce the engine braking exhaust valve events, including one or more compression release events and one or more BGR events, as explained above. This sequence may be reversed to transition back to positive power operation starting from an engine braking mode of operation.

With reference to FIGS. 4 and 8, in second and third alternatives, one, or the other, or both of the intake valve events 934 and/or 936 may be provided by employing a lost motion system or a variable valve actuation system to serve as the means for actuating an intake valve to provide engine braking 300. A lost motion system may selectively provide both intake valve events 934 and 936, while a variable valve actuation system may selectively provide one, or the other, or both intake valve events 934 and 936.

Instituting compression release engine braking using a system 10 that includes a hydraulic lost motion system or hydraulic variable valve actuation system may occur as follows. First, fuel is shut off to the engine cylinder in question and a predetermined delay is incurred to permit fuel to clear from the cylinder. Next, the intake side solenoid hydraulic control valve may be activated to supply hydraulic fluid to the main intake rocker arm 400 and the intake valve bridge 700. This may cause the intake valve bridge body 710 to unlock from the outer plunger 720 and disable main intake valve events. Finally, the exhaust side solenoid hydraulic control valve may be activated to supply hydraulic fluid to the main exhaust rocker arm 200 and the means for actuating an exhaust valve to provide engine braking 100. This may cause the exhaust valve bridge body 710 to unlock from the outer plunger 720 and disable the main exhaust valve event. Supply of hydraulic fluid to the means for actuating an exhaust valve to provide engine braking 100 may produce the desired engine braking exhaust valve events, including one or more compression release valve events 920, and one or more BGR valve events 922 and 924, as explained above. This sequence may be reversed to transition back to positive power operation starting from an engine braking mode of operation.

Figure 9:
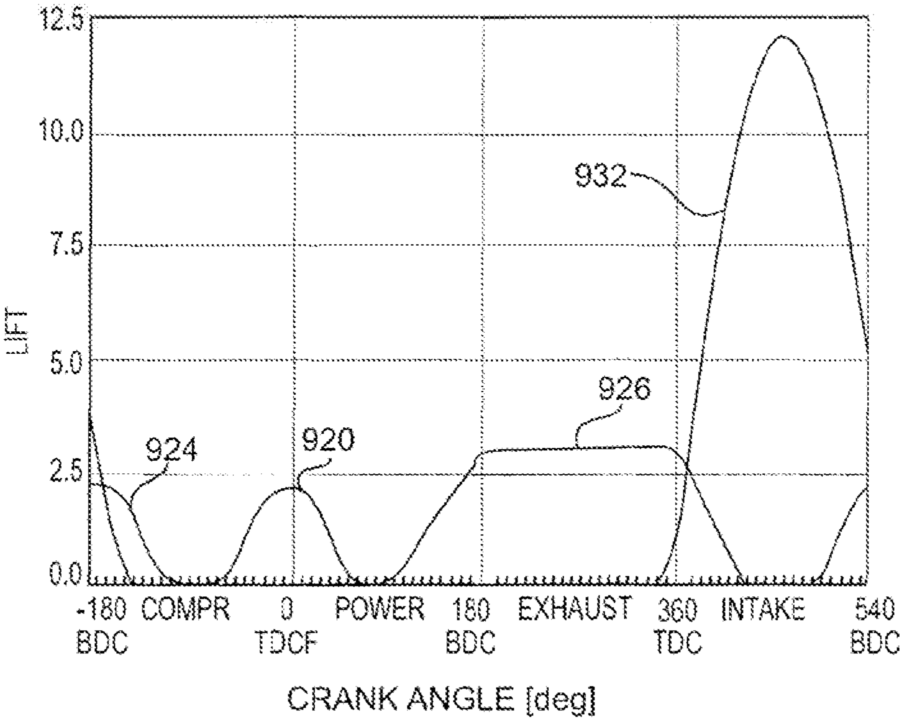
FIG. 9 is a graph illustrating exhaust and intake valve actuations during a two-cycle compression release and partial bleeder engine braking mode of operation provided by embodiments of the present invention.

Another alternative to the methods described above is illustrated by FIG. 9. In FIG. 9 all valve actuations shown are the same as described above, and may be provided using any of the systems 10 described above, with one exception. Partial bleeder exhaust valve event 926 (FIG. 9) replaces BGR valve event 922 and compression release valve event 920 (FIGS. 5 and 8). This may be accomplished by including a partial bleeder cam bump on the exhaust cam in place of the two cam bumps that would otherwise produce the BGR valve event 922 and the compression release valve event 920.

It is also appreciated that any of the foregoing discussed embodiments may be combined with the use of a variable geometry turbocharger, a variable exhaust throttle, a variable intake throttle, and/or an external exhaust gas recirculation system to modify the engine braking level achieved using the system 10. In addition, the engine braking level may be modified by grouping one or more valve actuation systems 10 in an engine together to receive hydraulic fluid under the control of a single solenoid hydraulic control valve. For example, in a six cylinder engine, three sets of two intake and/or exhaust valve actuation systems 10 may be under the control of three separate solenoid hydraulic control valves, respectively. In such a case, variable levels of engine braking may be provided by selectively activating the solenoid hydraulic control valves to provide hydraulic fluid to the intake and/or exhaust valve actuation systems 10 to produce engine braking in two, four, or all six engine cylinders.

It will be apparent to those skilled in the art that variations and modifications of the present invention can be made without departing from the scope or spirit of the invention. For example, the means for actuating an exhaust valve to provide engine braking 100 and the means for actuating an intake valve to provide engine braking 300 may provide non-engine braking valve actuations in other applications. Furthermore, the apparatus shown to provide the means for actuating an exhaust valve to provide engine braking 100 and the means for actuating an intake valve to provide engine braking 300 may be provided by apparatus other than that shown in FIGS. 3 and 4.

What is claimed is:

1. A valve bridge for use in an internal combustion engine comprising a plurality of cylinders, the valve bridge comprising:

a valve bridge body configured to extend between two valves for a cylinder of the plurality of cylinders, the valve bridge body having a central opening extending through a thickness of the valve bridge body at a location between the two valves; and a first lost motion assembly disposed within the central opening and selectively operable to lose all valve actuation motions applied to the first lost motion assembly, wherein the valve bridge body further comprises a side opening having a sliding pin disposed therein, the side opening and sliding pin configured to align with a first valve of the two valves, wherein engine braking events are imparted to the first valve of the two valves via the sliding pin and a second lost motion assembly that is capable of selective actuation according to different operating conditions of the internal combustion engine.

2. The valve bridge of claim 1, wherein the engine braking events imparted to the first valve of the two valves via the second lost motion assembly comprise at least two compression release events for every four engine strokes.

3. The valve bridge of claim 1, wherein the second lost motion assembly comprise a hydraulic lost motion assembly.

4. The valve bridge of claim 1, wherein the first lost most assembly comprises a hydraulic lost motion assembly.

5. The valve bridge of claim 1, wherein the two valves comprise two exhaust valves.

6. The valve bridge of claim 1, wherein the two valves comprise two intake valves.

7. The valve bridge of claim 4, wherein the central opening has a first recess formed in a side wall thereof and wherein the hydraulic lost motion assembly comprises:

an outer plunger slidably disposed within the central opening and having an interior bore, the outer plunger further having a side opening extending through a side wall of the outer plunger and communicating with the interior bore;

an inner plunger slidably disposed within the interior bore and having a second recess formed therein; and a locking component disposed in the side opening of the outer plunger, wherein alignment of the first recess, the side opening of the outer plunger and the second recess permits the locking component to engage the second recess and thereby permit the outer plunger to freely move within the central opening, and wherein alignment of the first recess and the side opening of the outer plunger but not the second recess forces engagement of the locking component and the first recess thereby preventing movement of the outer plunger within the central opening.

8. The valve bridge of claim 7, wherein the locking component comprises a ball.

9. The valve bridge of claim 1, wherein the first lost motion assembly conveys valve actuations motions received from a first valve actuation motion source and the second lost motion assembly conveys valve actuation motions received from a second valve actuation motion source apart from the first valve actuation motion source.

10. An apparatus for engine braking, comprising:

an exhaust rocker arm comprising a first hydraulic passage;

a valve bridge contacting assembly, operatively connected to the exhaust rocker, comprising an adjustment screw coupled to a swivel foot, the valve bridge contacting assembly further comprising a second hydraulic passage in fluid communication with the first hydraulic passage;

the valve bridge of claim 1 operatively connected to the valve bridge contacting assembly and two exhaust valves, the first lost motion assembly of the valve bridge configured for fluid communication with the valve bridge contacting assembly, the first lost motion assembly further configured to lose motion received from the exhaust rocker arm via the valve bridge contacting assembly when charged with hydraulic fluid received via the second hydraulic passage; and an engine braking rocker arm comprising a third hydraulic passage and the second lost motion assembly in fluid communication with the third hydraulic passage, the second lost motion assembly configured to actuate the first exhaust valve of the two exhaust valves when charged with hydraulic fluid received via the third hydraulic passage, wherein main exhaust valve events are lost by the first lost motion assembly and wherein the engine braking events are imparted to the first exhaust valve via the second lost motion assembly, the engine braking events comprising at least two compression release events for every four engine strokes.

* * * * *